Nov. 16, 1965     C. D. HOLBEN     3,217,920

SUSPENSION SYSTEM FOR DEWAR-TYPE CONTAINERS

Filed July 25, 1963

INVENTOR.
Clair D. Holben
BY
ATTORNEYS

United States Patent Office 3,217,920
Patented Nov. 16, 1965

3,217,920
SUSPENSION SYSTEM FOR DEWAR-TYPE CONTAINERS
Clair D. Holben, Denver, Colo., assignor to Cryogenic Engineering Company, Denver, Colo., a corporation of Colorado
Filed July 25, 1963, Ser. No. 297,632
4 Claims. (Cl. 220—15)

This invention relates to a support system for use in containers for cryogenic fluids and more particularly relates to a support system for use in Dewar-type cryogenic vessels.

Cryogenic tanks of the type referred to above have an inner tank member within an outer vacuum-tight jacket usually supported by long rods, tubes or cables. In providing a supporting system for the inner tank, the practice has been to use stainless steel cables which give a fairly low heat transfer per unit of strength. Such cables are always loaded in direct tension since this is the only direction in which they will effectively support a load. Occasionally the rods or tubes are loaded in both tension and compression but often they are loaded in tension only.

The inner tank usually is supported in six different directions and to achieve this support with tension members, many pairs of tension members must be provided. This requirement necessitates considerable spacing between the inner and outer members which, together with the number of fastenings, complicates the installation and makes proper adjustment more difficult. Usually reentry tubes into the inner tank are required which are a source of potential vacuum leak and reduce the efficiency of the insulation materials disposed between the inner and outer members.

The present invention provides an innovation in the assembly of Dewar-type containers for cryogenic fluids in that only two points of interconnection are provided between the inner and outer members in a novel assembly which has very low heat conductivity and ample strength to satisfy all the load requirements of such containers. One of the novel features of the assembly is the utilization of hollow epoxy-glass laminate members as the bridging portion of the structure disposed between the inner and outer members which possess extremely low thermal conductivity and the ratio of thermal conductivity to strength is approximately fifty times more favorable for the laminate material than for stainless steel as now being used for existing interconnections. By utilizing hollow members of the aforesaid type, I obtain high strength to support bending loads with a small amount of material. I also provide means to evacuate the gas from the hollow interior portions of same and thus improve the insulation qualities of such members.

It is an object of my invention to provide a simple, economical and efficient suspension system for cryogenic vessels which possesses a high degree of strength and low thermal conductivity.

Another object of my invention is to provide a suspension system for Dewar-type containers for cryogenic fluids which utilizes only two points of interconnection between the inner and outer members, one of which has a fixed connection and the other of which is unsecured so as to provide a floating effect to accommodate shrinkage in the inner member due to the low temperature of fluids contained therein.

Other objects reside in novel details of construction and novel combinations and arrangements of parts, all of which will be set forth in the course of the following description.

The practice of my invention will be described with reference to the accompanying drawings, in the several views of which like parts bear similar reference numerals. In the drawings.

Figure 1:
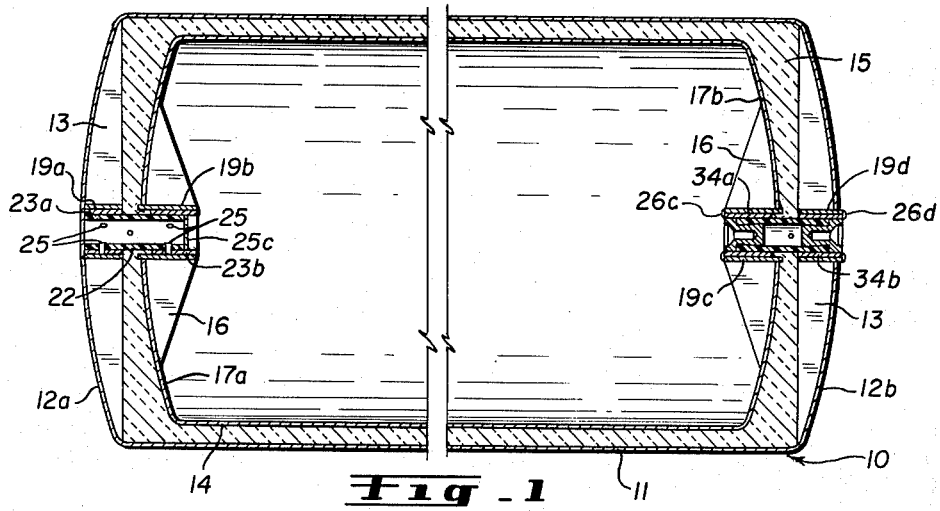
FIG. 1 is a vertical section through a storage container assembly utilizing a preferred form of suspension system.

A typical installation embodying features of my invention has been shown in FIG. 1. A Dewar-type storage container 10 is supported with its lengthwise axis disposed horizontally and comprises an outer hollow member or shell 11, closed at its ends 12a and 12b, and web members 13 are secured on the inner surface of said ends as stabilizing or reinforcing structure. An inner hollow member or body 14 is disposed interiorly of container 10 in spaced relation thereto and the space between said members 10 and 14 is substantially filled with heat-insulation material 15 and is gas evacuated. Webs 16 are secured on the inner ends 17a and 17b of member 14 as reinforcing or stabilizing structure.

Figures 2, 3:
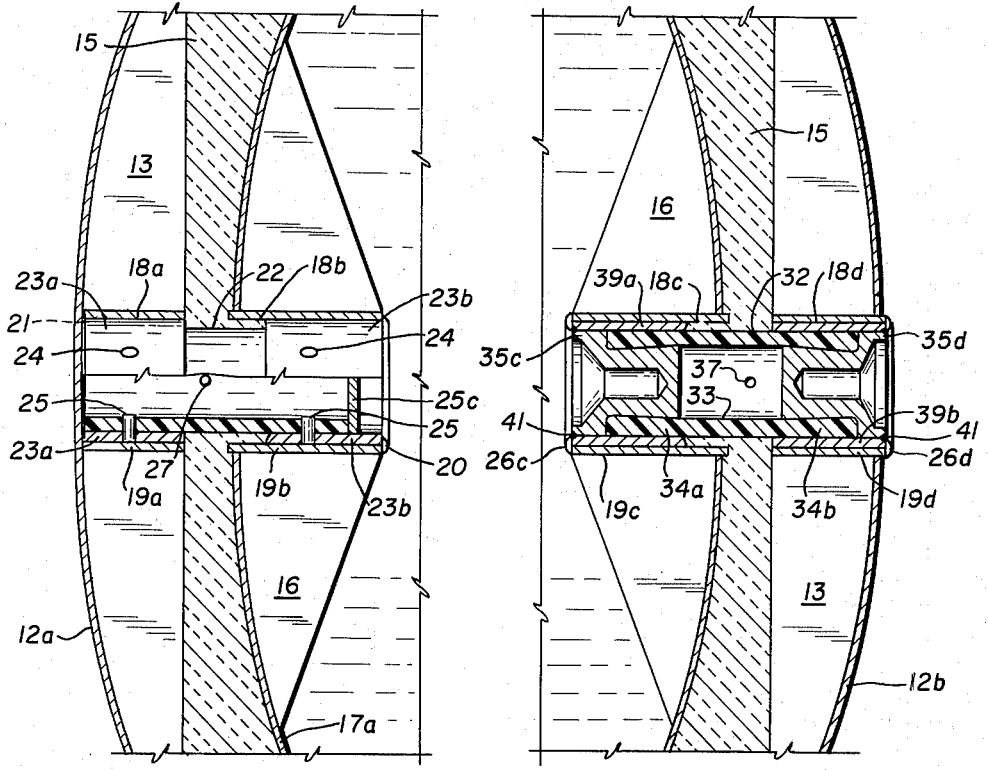
FIG. 2 is an enlarged fragmentary section of the interconnection at one end of the assembly shown in FIG. 1.
FIG. 3 is another fragmentary section illustrating the interconnection utilized at the opposite end of the container shown in FIG. 1.

As best shown in FIGS. 2 and 3, means are provided at each end of each of said members which define alined openings or bores 18a, 18b 18c and 18d forming part of a supporting system providing the sole interconnection between said members, and the entire support for the inner member 14 and its contents. Said means include annular members 19a, 19b, 19c and 19d extending inwardly from ends 12a, 17a, 17b and 12b, respectively, and supported by webs 13, 16, 16 and 13. This structural arrangement provides an assembly of aligned openings in pairs, comprising openings or bores 18a and 18b as one pair and openings or bores 18c and 18d as a second pair. In a preferred arrangement, al of the bores 18a, 18b, 18c and 18d are concentric and, in any event, are alined for balanced or symmetrical support of the inner member 14 within the outer member 10.

Due to the extremely low temperatures maintained by the storage of cryogenic fluids within inner member 14, it tends to shrink when extremely low temperatures are developed, and if said member is maintained in a rigid supporting assembly, as for example, rod or tube connections, such shrinkage may result in damage to or breaking of components of the assembly. Also, if flexible connections such as stainless steel cables are utilized, which provide adequate structural support, they require more space between the inner and outer members and holes in the insulation where they pass through, which lessens the effectiveness of such insulation.

The arrangement of my invention provides an effective supporting system having only two points of interconnection between the inner and outer members and a floating effect in one interconnection so that any shrinkage which develops is effectively accommodated without strain or damage to the fastenings of the assembly.

Preferred forms of interconnection have been shown in FIGS. 2 and 3. Referring first to FIG. 2, the annular support members 19a and 19b cooperate to define a sectional sleeve assembly having a vacuum-tight welded connection 20 or other fixed fastening at its inner end, but when desired, such fixed fastening may be at the outer end as indicated by the dash lines 21.

The interconnection shown provides a floating effect and includes a tubular body of epoxy-glass laminate composition 22, preferably of uniform inside and outside diameter. The ends of said body are secured within inner sleeve members 23a and 23b in fitted engagement with the support members 19a and 19b, respectively. The end or head 12a of outer member 10 is closed adjoining member 19a and thus prevents vacuum loss at the outer end of the interconnection assembly and eliminates the need for vacuum-tight seals at such end. This arrangement also permits the support members 19a and 19b to be welded to webs 13 and 16, respectively, without damage to interior parts and provide a secure seating for the inner sleeve members 23a and 23b when they are subsequently fitted therein.

The space between the inner and outer supported portions of the interconnection is bridged by the hollow tubular member of epoxy-glass laminate composition 22 which does not take end loading and therefore may be tubular with uniform inner and outer diameters. The round shaping provides high strength to support bending loads with only a small amount of material provided in the tubular body. As shown in FIG. 2, the inner support portion preferably is held against movement, while the outer support portion is the floating section. However, a reversal of these arrangements may be provided is desired.

In order to effectively secure the tubular member 22 in the aligned openings, a series of apertures 24 are provided for the reception of tapered pins 25 which are secured on the inner sleeve members 23a and 23b. After being fitted in the openings 24, the outermost portions of the pins are machined to provide a smooth external surface fitting the bores 18a and 18b. An end bushing 25c is bonded to the tubular member 22 at its outer end and the latter also is bonded to sleeves 23a and 23b along its inwardly-extending internal surface.

As shown in FIG. 3, the interconnecting assembly is generally similar to the one shown in FIG. 2, but has vacuum-tight connections 26c and 26d at its opposite ends thereby preventing any relative movement between ends 12b and 17b of members 10 and 14. In this form, the annular support members 19c and 19d cooperate to enclose a sectional sleeve assembly having vacuum-tight welded connections at 26c and 26d. A tubular body of epoxy-glass laminate composition 32 is fitted within inner sleeves 39a and 39b of said sectional sleeve assembly and has a smooth cylindrical exterior surface and an internal surface cylindrical in its intermediate portion 33 and tapering inwardly in its end portions 34a and 34b to provide wedging surfaces which interlock with end bushings 35c and 35d, preferably formed of stainless steel, and which are fitted in sleeves 39a and 39b in engagement with the internal surfaces of body 32. Preferably, vacuum-tight seals 41 are provided after the bushings 35c and 35d are fitted in place.

The foregoing arrangement permits inner member 14 to be maintained in spaced relation to outer member 10 with interconnections at only two points. Any thrust developing from external forces, such as airplane movement, transportation shock, etc. is accommodated in said interconnecting assembly by the floating arrangement of the supporting structure. In addition, the floating effect prevents deleterious stresses being encountered due to shrinkage. Webs 13 and 16 provide all the reinforcing required to support the loads at such points, thus simplifying assembly, and holding the spacing requirements to a minimum. The only part of the interconnection bridging the space between the inner and outer members of the container is the epoxy-glass laminate body 22 (FIG. 2) or the corresponding part 32 (FIG. 3). The hollow shaping of these bodies provides ample structural strength and they have very low heat-conductivity. In addition, openings 27 and 37, respectively, permit them to be evacuated, therey increasing their insulation effect.

The epoxy-glass fiber body 22 preferably is formed as a laminated structure utilizing a pre-impregnated cloth, the fibers of which are oriented to provide maximum strength. Any other suitable material possessing similar conductivity and strength characteristics may be utilized in the assembly shown and described, but I have found the epoxy-glass fiber composition well suited for the purposes of this invention.

In the preceding description, reference has been made to an installation of the suspension system in a container disposed horizontally. However, the support system of the present invention is effective in supporting the inner tank member for loads in any one of six directions or combinations of loads in these directions; consequently, the mounting position of the container does not alter the effectiveness of the support system as described.

The term "container" as used in this specification is intended as a generic term applying to tanks or similar equipment for storage or transport of cryogenic fluids and more specifically of the Dewar-type, and which may be of a stationary or mobile character. Also, as noted above, such equipment may be maintained with its lengthwise axis disposed horizontally or vertically.

The insulation material 15 may be of any suitable type and usually will be of a laminated type having alternate layers of aluminum foil separated by layers of glass fiber cloth or similar material. Such material is widely used in Dewar-type containers for cryogenic fluids and detailed description of its composition and fabrication appears unnecessary.

No mention is made in the preceding description of the means for introducing and withdrawing cryogenic fluid from inner container 14. Since the present invention is applicable to any of the well-known containers of the Dewar-type, the manner of charging and emptying same is not a part of the present invention. Changes and modifications may be availed of within the spirit and scope of my invention as set forth in the hereunto appended claims.

I claim:

1. In a suspension system for Dewar-type containers, means providing a supporting interconnection between the ends of an outer member and an inner member in spaced relation thereto with the lengthwise axes of said members disposed horizontally, said means including gussets on inner surfaces of corresponding ends of said members, sleeve members secured on the respective gussets and defining a pair of concentric bores at a corresponding end of said members, a hollow, epoxy-glass laminate body having end portions disposed within each of said pairs of concentric bores and bridging the space therebetween, and a bushing extending into each of said pairs of bores having an external surface fitted in the associated sleeve and an internal surface in engagement with an end portion of the hollow member.

2. The combination with a container for cryogenic fluids, including an outer hollow member, an inner hollow member for storage of such fluids, and heat-insulating material in the space between said members, said space being gas evacuated, of a suspension system providing the sole supporting interconnection for maintaining the inner member in spaced heat insulated relation to the outer member with the lengthwise axes of the members disposed horizontally, comprising means defining alined bores at the opposed ends of each of said members, and a bridging support in the alined bores at each end of the container, said bridging support for at least one end of the container including a sleeve fitted in each of the alined bores, a hollow body fitting within and extending between the sleeves, said hollow body attached to each of the sleeves and having means for evacuating its hollow portion, and means including a bushing bonded to one end of the hollow body and associated sleeve and a vacuum seal closing the exterior ends of the associated sleeve and alined bore for providing a fixed vacuum sealed connection at one end of the bridging support with the opposite end free to permit sliding movement between the sleeve and bore surfaces as the inner member shrinks, and said hollow body being formed of material of low heat conductivity and high strength, whereby heat transfer between said inner and outer members is substantially avoided.

3. In a suspension system for Dewar-type containers, means providing a supporting interconnection between the ends of an outer member and an inner member in spaced relation thereto with the lengthwise axes of said members disposed horizontally, said means including a pair of spaced alined bores at a corresponding end of said members, a hollow body of low heat-conductivity and a high degree of strength secured within each of said pairs of alined bores and bridging the space therebetween, said hollow body at one end of the container including interior tapering surfaces at its opposite ends for wedging engagement with the interior surface of the holding engagement means, and means in each of said pairs of bores in holding engagement with an end portion of the body and having an external surface fitted in the bore.

4. In a suspension system for Dewar-type containers, means providing a supporting interconnection between the ends of an outer member and an inner member in spaced relation thereto with the lengthwise axes of said members disposed horizontally, said means including a pair of spaced alined bores at a corresponding end of said members, a hollow body of low heat-conductivity and a high degree of strength secured within each of said pairs of alined bores and bridging the space therebetween, said hollow body at one end of the container including an internal surface tapering inwardly from its ends and the holding engagement means including an external surface sealing in vacuum tight arrangement the ends of the body with an internal surface in wedging engagement with the tapered surfaces of the hollow body, and means in each of said pairs of bores in holding engagement with an end portion of the body and having an external surface fitted in the bore.

References Cited by the Examiner
UNITED STATES PATENTS

| | | | |
|---|---|---|---|
| 2,596,244 | 5/1952 | Jacket | 220—15 |
| 2,729,357 | 1/1956 | Nason et al. | 220—15 |
| 2,823,822 | 2/1958 | Attman | 220—15 |
| 2,858,136 | 10/1958 | Rind | 220—15 |
| 2,874,865 | 2/1959 | Canty et al. | 220—15 |
| 3,069,045 | 12/1962 | Haumann et al. | 220—15 |
| 3,080,086 | 3/1963 | James | 220—15 |
| 3,101,862 | 8/1963 | Matsch | 220—14 |
| 3,132,762 | 5/1964 | Gabarro et al. | 220—15 |

THERON E. CONDON, *Primary Examiner.*